C. BEECHER.
End-Gate for Wagons.

No. 215,430. Patented May 20, 1879.

Witnesses:
Fred G. Dieterich
J. R. Littell

Inventor:
Charles Beecher
by
C. A. Snow & Co.
Atty's.

UNITED STATES PATENT OFFICE.

CHARLES BEECHER, OF FAIRMONT, NEBRASKA.

IMPROVEMENT IN END-GATES FOR WAGONS.

Specification forming part of Letters Patent No. 215,430, dated May 20, 1879; application filed February 11, 1879.

*To all whom it may concern:*

Be it known that I, CHARLES BEECHER, of Fairmont, in the county of Fillmore and State of Nebraska, have invented certain new and useful Improvements in End-Gate Fastenings; and I do hereby declare that the following is a full, clear, and exact description of the invention, which will enable others skilled in the art to which it appertains to make and use the same, reference being had to the accompanying drawings, which form a part of this specification.

Figure 1:
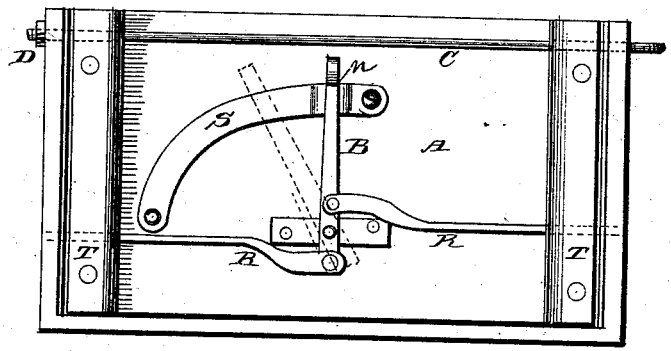
Figure 2:
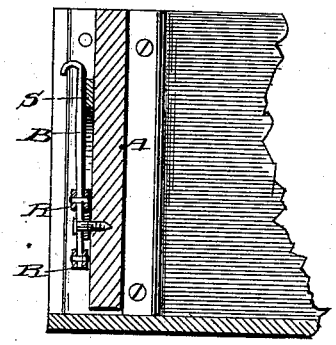
Figure 3:
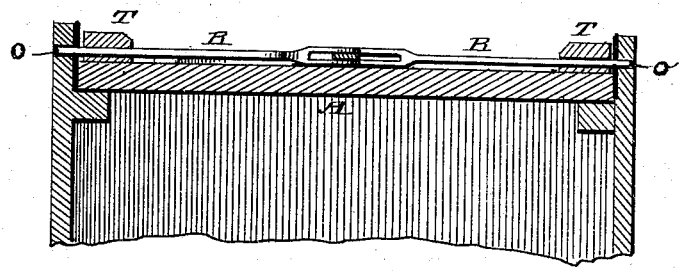

Figure 1 is an elevation. Fig. 2 is a vertical cross-section; and Fig. 3 is a longitudinal sectional view.

Corresponding parts in the several figures are denoted by like letters of reference.

This invention relates to end-gates for wagons; and it consists in certain improvements in the fastenings for the same, which will be hereinafter more fully described, and particularly pointed out in the claim.

In the drawings, A represents the end-gate, which is pivoted to the end of a wagon-body by a rod, C, which may be removed by removing the nut D, which holds it in place.

B is a lever pivoted near its lower end upon the end-gate. To the lever B, above and below its fulcrum, are pivoted two rods, R R, projecting in opposite directions through bearings in the cleats T T at the sides of the gate. Openings $o$ $o$ are formed in the sides of the wagon-body to receive the projecting ends of rods R R. Suitable openings are also formed in the cleats T T to form bearings for the said rods R R.

A metallic arc, S, segmental to the fulcrum of lever B, is secured upon the end-gate, as shown. Said arc forms a slide for lever B, to enable the latter to be more easily operated, and it is provided with a notch, $n$, to receive the handle of the lever. Lever B should be a spring having sufficient elasticity to keep it, automatically, in the notch $n$.

From the foregoing description, and by reference to the drawings hereto annexed, the operation of my invention will be readily understood. By disengaging the lever from notch $n$, and moving it to one side, the ends of rods R R are drawn out of the openings $o$ $o$ in the sides of the wagon-body, thus enabling the gate to swing open. By reversing this operation the gate is closed and held secure.

I am aware that a lever having sliding lock-bars pivoted thereto is old, as shown in the patent to Cary, December 31, 1872; Rand, November 4, 1873, and Dodd's, March 10, 1868. Such arrangement, therefore, I do not claim, broadly; but,

Having thus described my invention, I claim and desire to secure by Letters Patent of the United States—

As an improvement in end-gate fastenings, the spring-lever B, having pivoted rods R R working in bearings in the cleats T T, in combination with the arc S, having notch $n$, substantially as and for the purpose herein shown and specified.

In testimony that I claim the foregoing as my own I have hereto affixed my signature in presence of two witnesses.

CHARLES BEECHER.

Witnesses:
E. B. BRANCH,
J. R. VAN BOSKIRK.